(No Model.)
W. A. KRAG.
COFFEE POT.
No. 374,603. Patented Dec. 13, 1887.
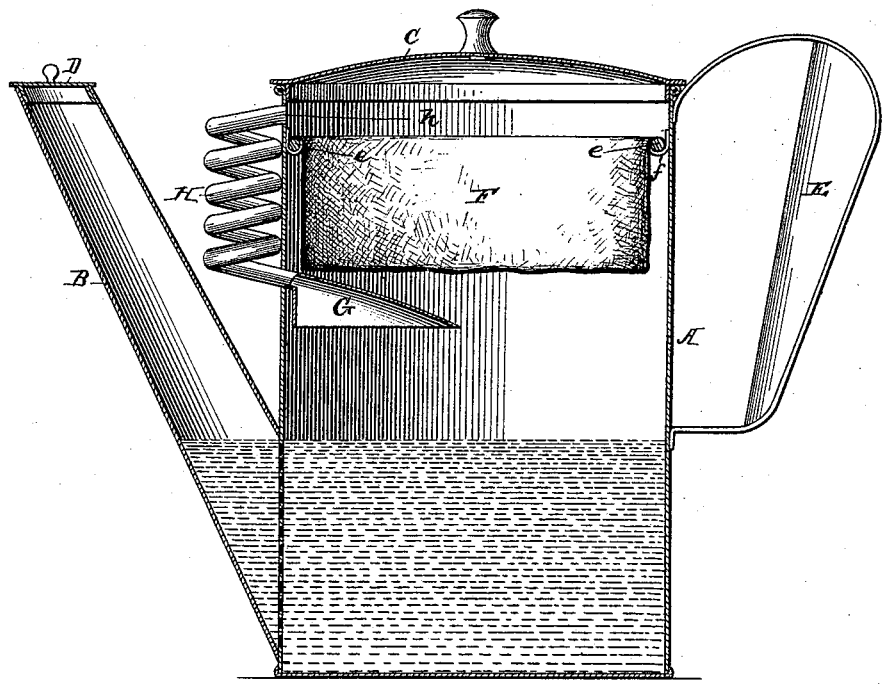
Witnesses
Jno. G. Hinkel Jr.
Sidney L. Johnson
Inventor
William A. Krag,
By his Attorneys
Foster & Freeman

UNITED STATES PATENT OFFICE.

WILLIAM A. KRAG, OF INDIANAPOLIS, INDIANA.

COFFEE-POT.

SPECIFICATION forming part of Letters Patent No. 374,603, dated December 13, 1887.

Application filed March 10, 1887. Serial No. 230,422. (No model.)

*To all whom it may concern:*

Be it known that I, WILLIAM A. KRAG, a citizen of the United States, residing at Indianapolis, Marion county, Indiana, have invented certain new and useful Improvements in Coffee-Pots, of which the following is a specification.

This invention relates to that class of vessels for preparing decoctions wherein the extract or article from which the decoction is to be prepared is suspended or supported in the vessel, so as to prevent it touching the heated surface of the bottom or from boiling or rising to too high a temperature.

The present invention consists in the improved structure hereinafter fully described.

The figure of the drawing illustrates the present improvement in sectional elevation.

The coffee-pot or other vessel consists of a cylindrical vessel, A, provided with a spout, B, projecting from a point near its bottom, and also with a handle, E. The top of the vessel is provided with a closing-lid, C, and the mouth of the spout is also preferably provided with a lid, D.

The extract or article from which the decoction is to be prepared is suspended within the vessel A in a cotton or other bag, F; or it may be a reticulated cup or a vessel having a perforated bottom. The bag F is secured to circular frame e, which is held in place so as to suspend the bag by lugs f, projecting from the side of the vessel. Immediately under the suspended bag there is provided a pipe, which has a funnel-shaped mouth, G, opening downward, said pipe being projected through the wall of the vessel A and directed upwardly outside thereof, and formed in the shape of a coil, H, the upper end of which coil again enters the wall of the vessel and opens therein at a point, h, just above the top of the suspended bag F.

The operation of the improved vessel or coffee-pot is as follows: A quantity of boiling water is poured into the vessel until it reaches a point just below the funnel-shaped mouth G. The quantity, however, may be less, it being of course regulated by the quantity and strength of the decoction to be made. The coffee or extract is placed in the suspended bag F. The two lids C and D are placed in position to close the mouths of the vessel and its spout, and the vessel placed over the fire to cause its contained water to boil. During the steeping of the coffee the steam generated, owing to the obstruction formed by the suspended bag and its contents, will be directed by the funnel-shaped mouth G upward through the coiled pipe H, and issuing through its upper opening, h, over the top of the suspended bag and its contents, which will in time become saturated therewith. After the contents of the bag have become thus saturated, supplemented materially by the steam rising and penetrating the under side of the bag, the contents will be heated sufficiently to cause steam to accumulate directly under the lid C of the vessel, whereupon the quantity, being greater than that which can pass upward through the coil H, will pass through its opening downward through said coil into the lower part of the vessel, and in its passage through the coil H have its temperature reduced and be more or less condensed. This will be true to a greater extent when the vessel has been removed from over the fire and the further making of steam is stopped, when the coil H, becoming cooled by the atmosphere, will condense the steam passing from the top of the vessel downward therethrough.

From the improved structure it results that none of the flavor of the coffee or extract is lost by the escape of steam issuing through its spout or top, and that the steam accumulating above the contents of the bag, which necessarily holds more of the flavor of the contents in suspension than that below it, will be directed downward into the liquid below.

While the position of the funnel-shaped mouth of the coil as shown is preferred, the pipe may extend far enough into the vessel so that its mouth occupies a central position therein, and while only one coil H is represented two or more may be employed, either issuing from a single funnel-shaped mouth or from separate ones. It is also to be observed that while the bag or holder F is illustrated as a suspended one, it is obvious that a horizontal perforated partition extending to the walls of the vessel may be employed, and such partition may be removable or not.

What I claim is—

1. A closed vessel divided into upper and lower chambers by a permeable partition, provided with a coiled pipe arranged upon the outside of the vessel, one end of which opens therein above said partition and the other below it, where it terminates in a funnel-shaped mouth, substantially as described.

2. The closed vessel A, provided with the suspended bag F and a coiled pipe, H, arranged upon the outside of the vessel, one end of which opens therein above the bag F and the other below it and terminates in a funnel-shaped mouth, G, substantially as described.

In testimony whereof I have signed my name to this specification in the presence of two subscribing witnesses.

WILLIAM A. KRAG.

Witnesses:
HERMAN HARTMAN,
ALFRED F. POTTS.